March 5, 1935.  T. M. HUNTER  1,993,007
VOLTAGE REGULATING MEANS
Filed Dec. 7, 1933  11 Sheets-Sheet 1
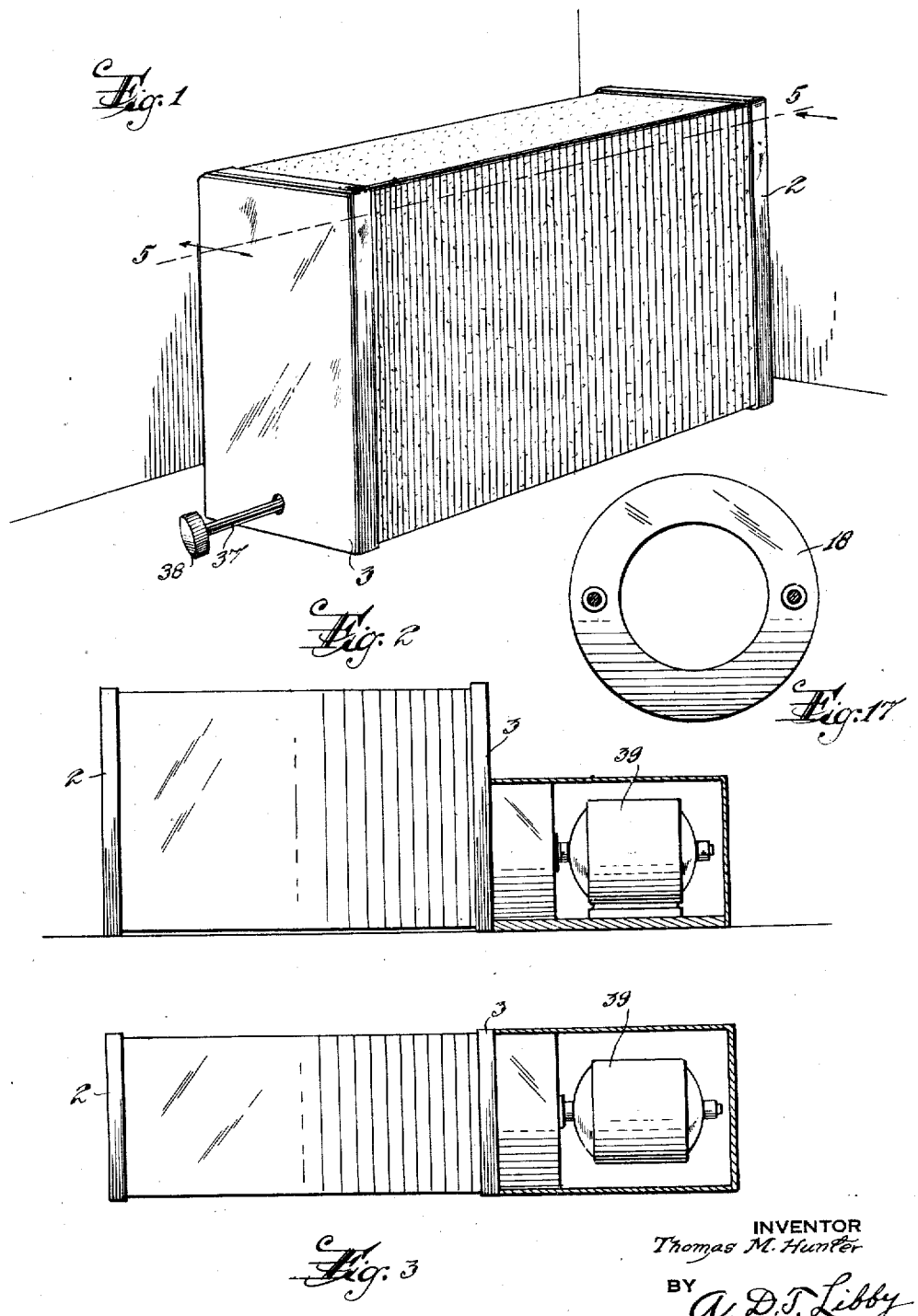
INVENTOR
Thomas M. Hunter
BY A. D. T. Libby
ATTORNEY March 5, 1935.  T. M. HUNTER  1,993,007
VOLTAGE REGULATING MEANS
Filed Dec. 7, 1933    11 Sheets-Sheet 2

INVENTOR
Thomas M. Hunter
BY A. D. T. Libby
ATTORNEY

March 5, 1935. T. M. HUNTER 1,993,007
VOLTAGE REGULATING MEANS
Filed Dec. 7, 1933 11 Sheets-Sheet 3
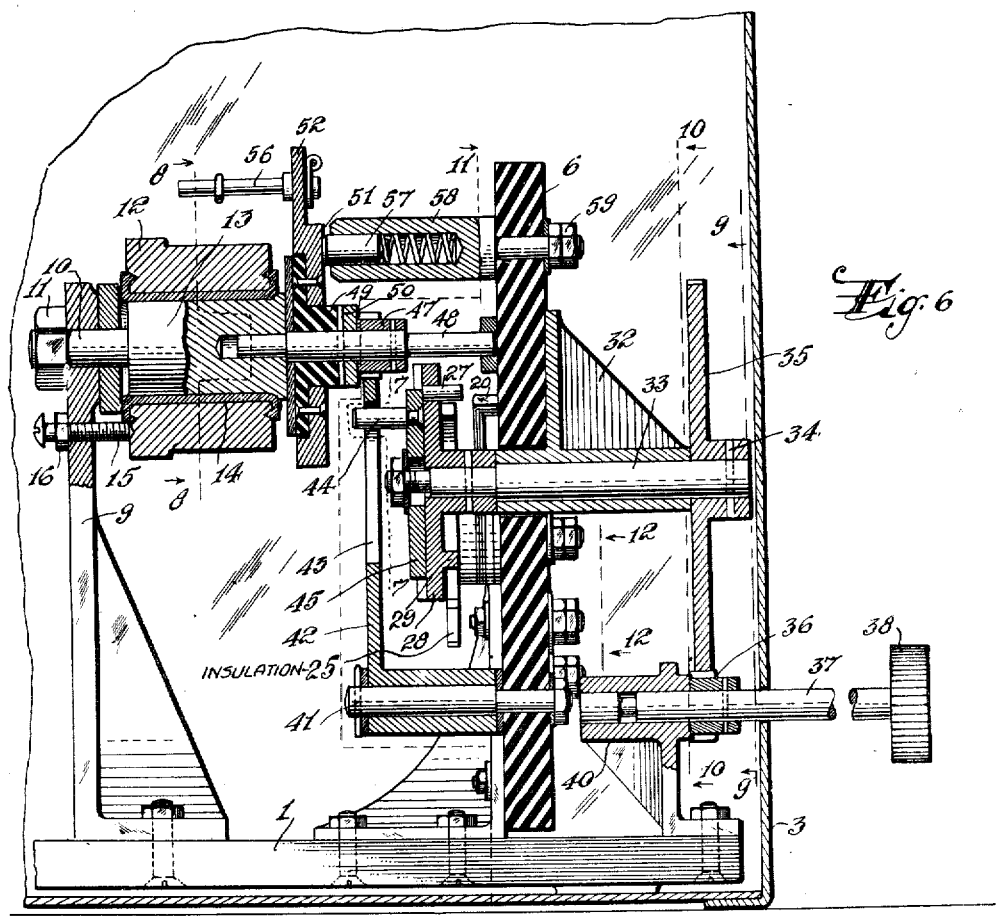
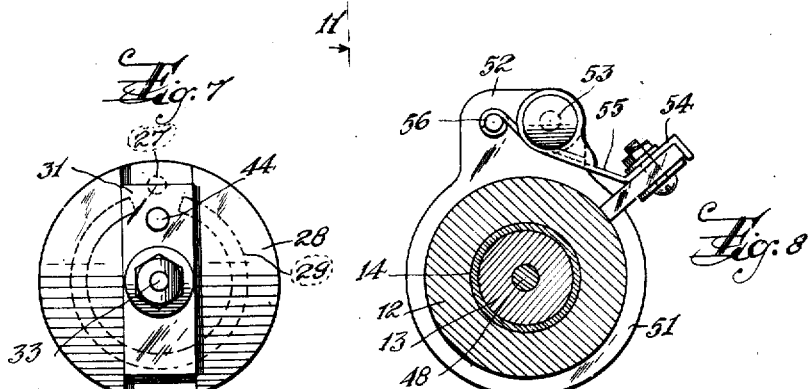
INVENTOR
Thomas M. Hunter
BY A. D. T. Libby
ATTORNEY

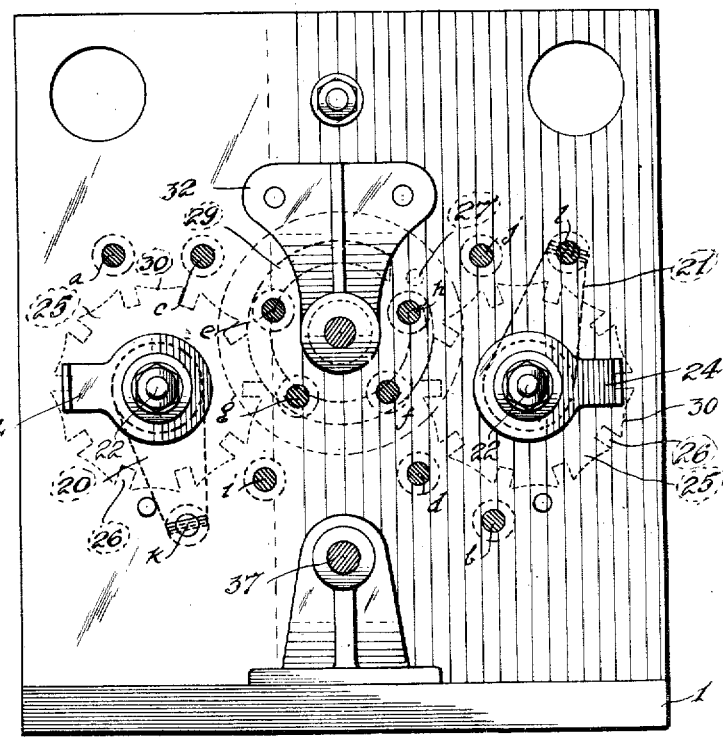
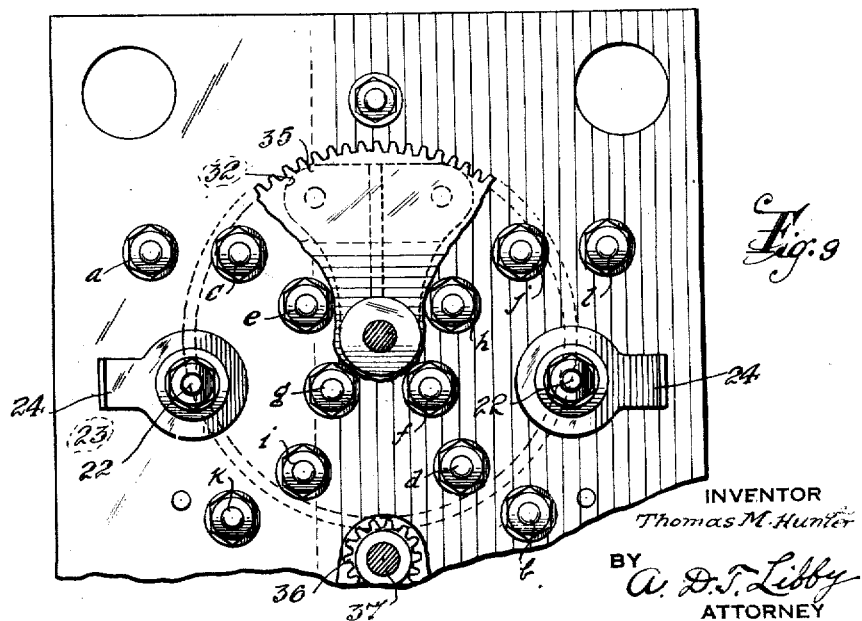

March 5, 1935.  T. M. HUNTER  1,993,007
VOLTAGE REGULATING MEANS
Filed Dec. 7, 1933  11 Sheets-Sheet 5

INVENTOR
Thomas M. Hunter
BY A. D. T. Libby
ATTORNEY

March 5, 1935.  T. M. HUNTER  1,993,007
VOLTAGE REGULATING MEANS
Filed Dec. 7, 1933  11 Sheets-Sheet 6
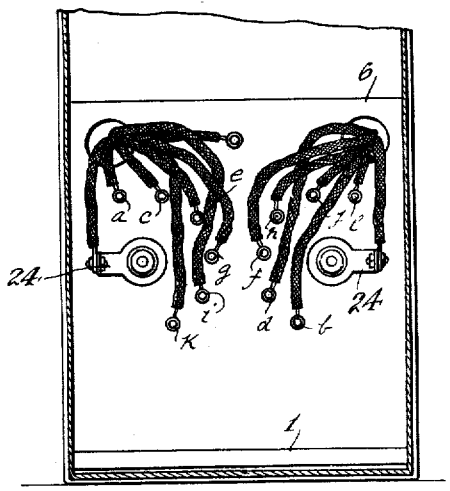
Fig. 12
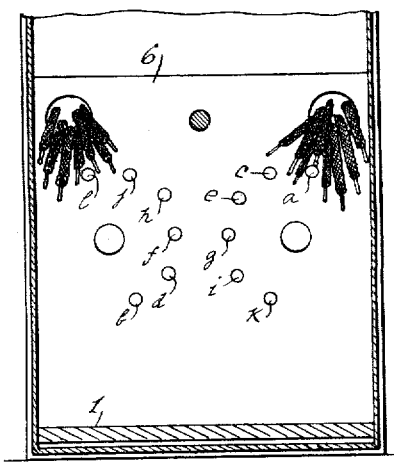
Fig. 13
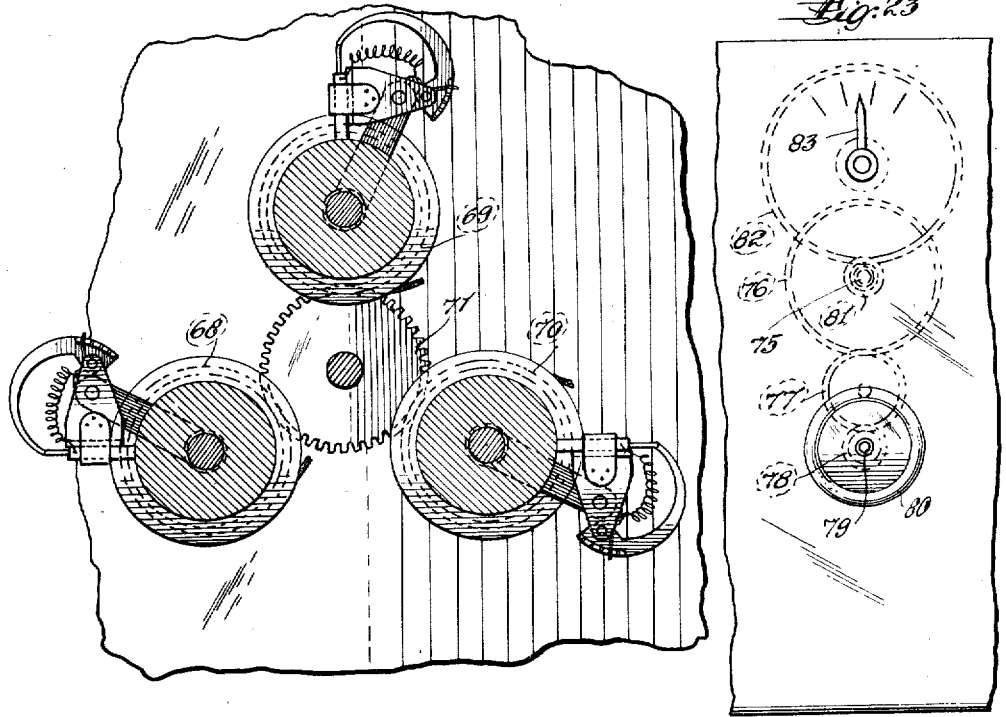
Fig. 24
Fig. 23
INVENTOR
Thomas M. Hunter
BY A. D. T. Libby
ATTORNEY March 5, 1935.  T. M. HUNTER  1,993,007
VOLTAGE REGULATING MEANS
Filed Dec. 7, 1933  11 Sheets-Sheet 7
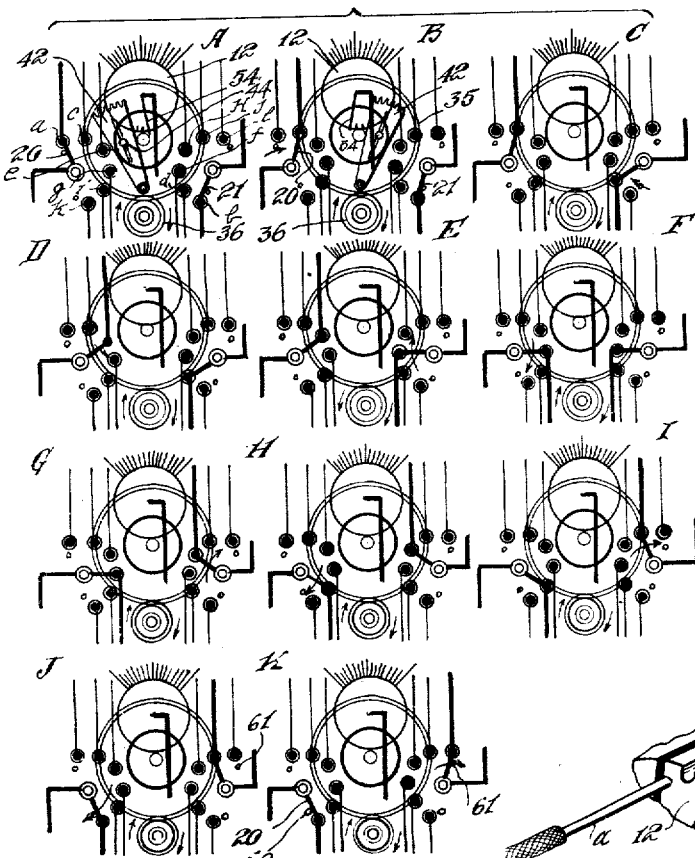
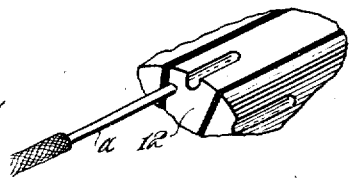
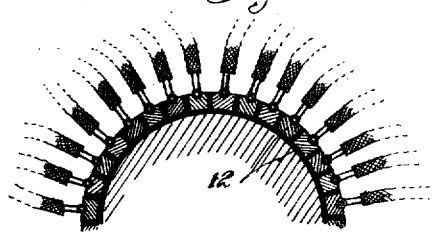
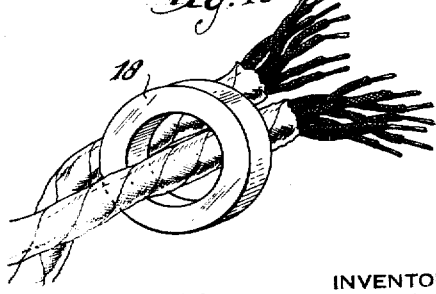
INVENTOR
Thomas M. Hunter
BY A. D. T. Libby
ATTORNEY March 5, 1935.   T. M. HUNTER   1,993,007
VOLTAGE REGULATING MEANS
Filed Dec. 7, 1933   11 Sheets-Sheet 8

INVENTOR
Thomas M. Hunter
BY A. D. T. Libby
ATTORNEY

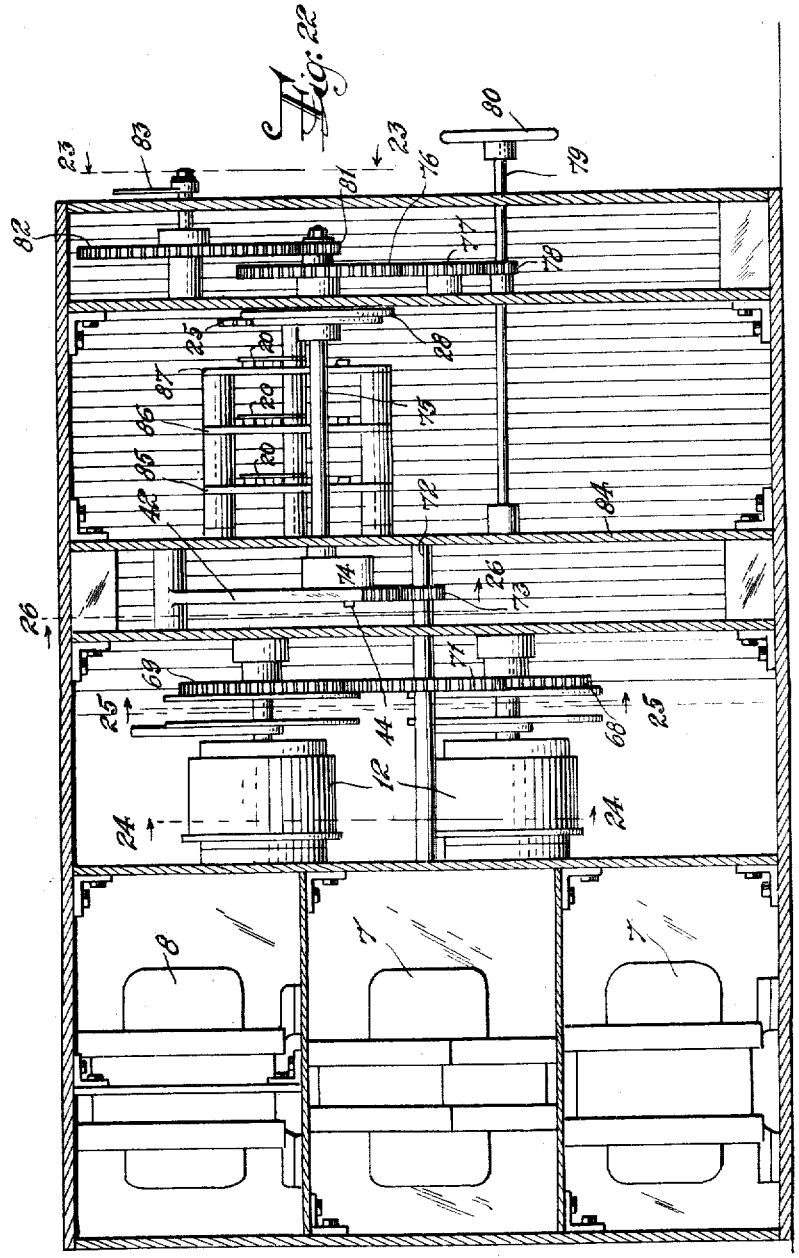

March 5, 1935.  T. M. HUNTER  1,993,007

VOLTAGE REGULATING MEANS

Filed Dec. 7, 1933  11 Sheets-Sheet 10

INVENTOR
Thomas M. Hunter

BY A. D. T. Libby
ATTORNEY

March 5, 1935. T. M. HUNTER 1,993,007
VOLTAGE REGULATING MEANS
Filed Dec. 7, 1933 11 Sheets-Sheet 11

INVENTOR
Thomas M. Hunter
BY A. D. T. Libby
ATTORNEY

Patented Mar. 5, 1935

1,993,007

UNITED STATES PATENT OFFICE 1,993,007

VOLTAGE REGULATING MEANS

Thomas M. Hunter, East Orange, N. J.

Application December 7, 1933, Serial No. 701,398

32 Claims. (Cl. 171—119)

This invention relates to ways and means for regulating the voltage of an alternating current circuit.

In my application, Serial No. 656,683, filed February 14, 1933, I have shown and described an improved form of voltage regulator and various means of operating said regulator. In the said application, I have also set forth the various ways in which voltage regulation has in the past been obtained, and the advantages of my improved means therein described.

The object of my present invention is to provide still further improvements in the voltage regulating means described and claimed in my prior pending application previously referred to.

Further and ancillary objects will be discerned by one skilled in this art, after a study of the specification taken in connection with the drawings, wherein:

Figure 1 is a perspective view of one form of voltage regulator.

Figure 2 is a side elevation of the regulator shown in Figure 1, but showing the motor control or actuating means in place of the manual actuating means shown in Figure 1.

Figure 3 is a top plan view of Figure 2.

Figure 6 is a side elevation of the apparatus at one end of the casing shown in Figure 4, but on a larger scale; as a matter of fact, the parts being substantially full size for a small capacity regulator.

Figure 7 is a view on the line 7—7 of Figure 6.

Figure 8 is a view on the line 8—8 of Figure 6 without any attempt to show the different collector or commutator bars.

Figure 9 is a view on the line 9—9 of Figure 6.

Figure 10 is a view on the line 10—10 of Figure 6 with certain of the parts which are hidden being shown in dotted line, and other parts removed or cut off.

Figure 12 is a view from the front of the switch-plate as shown in Figure 9, but with the taps from one of the transformers connected to the various switch contacts.

Figure 13 is a view similar to Figure 12, but looking at the back of the switch-plate.

Figure 14 is a partial sectional view of the collector or commutator showing the bars with the tap connections thereto.

Figure 15 is a perspective view of the end of the commutator showing one method of connecting one of the taps thereto.

Figure 16 is a perspective view showing the arrangement of taps with respect to a short-circuit limiting device.

Figure 17 is a plan view of the short-circuit limiting device shown in Figure 16.

Figure 20 is a diagrammatic arrangement illustrating the various steps in the operation of the form of controller diagrammatically illustrated in Figures 18 and 19.

Figure 22 is a longitudinal, sectional view through a three-phase controller.

Figure 23 is a view on the line 23—23 of Figure 22.

Figure 24 is a view on the line 24—24 of Figure 22, although the commutator bars are not shown in their true section.

Figure 4:
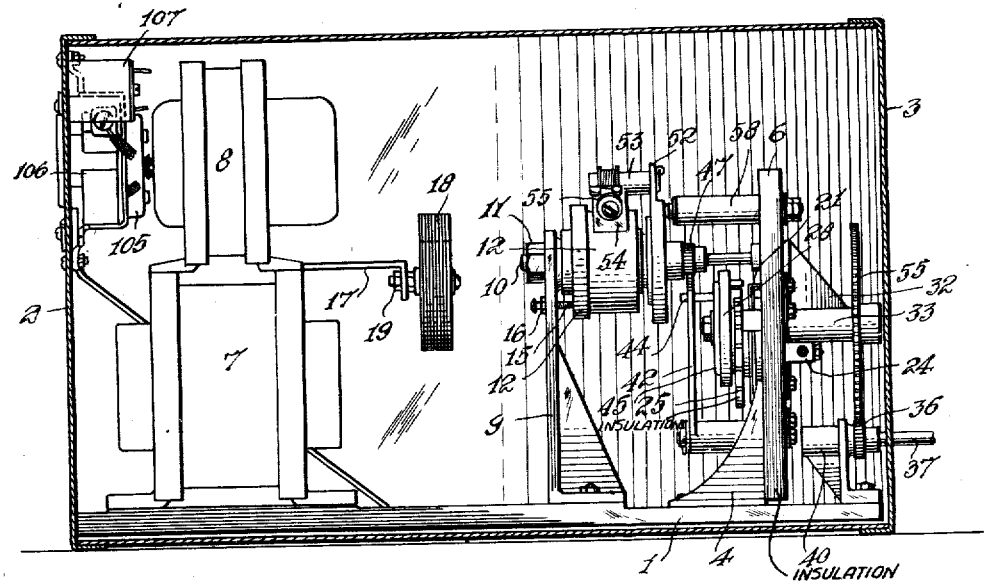
Figure 4 is a side elevation of the regulator shown in Figure 1, with the side of the casing removed, as well as the wiring between the various parts comprising the regulator.

Referring now to the details wherein like numbers refer to corresponding parts in the various views, 1 is the base of a casing having side, end and top members, the end members being numbered 2 and 3. Mounted on the base member 1, at one end thereof in any satisfactory manner as by brackets 4 and 5, is a switch-plate 6 of good strong insulating material. Mounted on the opposite end of the base 1, are a plurality of transformers 7 and 8. Between the transformers 7 and 8 and the switch-plate 6, is a standard or bracket 9 on which is supported, by means of a bolt 10 and nut 11, a collector 12. The collector 12 is preferably made up like a commutator; that is, it has a relatively large number of bars of good conducting material such as copper, insulated from each other and assembled in the usual type of commutator construction, the bars being insulated from the spindle 13 by an insulator 14.

To prevent the collector 12 from turning on the bracket 9, a set screw 15 with a lock-nut 16 may be utilized. The set screw 15, as shown in the small type of commutator illustrated, may engage against an insulated collar at the end of the commutator, or as shown, it may engage one or two of the bars which are not connected to any taps leading to the transformer, as it will be later pointed out that the brush which rotates around the collector does not contact with these two idle bars.

Figure 5:
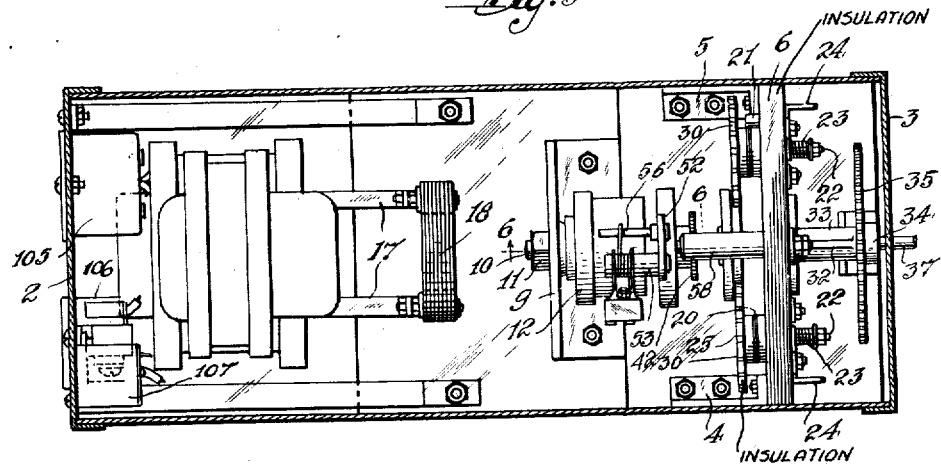
Figure 5 is a top plan view of Figure 4, with the top part of the casing removed.

Mounted between the transformers 7 and 8 and the collector 12 on a pair of arms 17, is a short-circuit limiting device 18. As shown in Figures 16 and 17, this device comprises an annular ring of good magnetic material such as transformer laminations bolted together by bolts 19 which may be extended to engage the downwardly turned ends of the arms 17 as illustrated in Figures 4 and 5.

The taps $a$ to $x$, where $x$ is some unknown quantity extending from the transformer 8 having a winding S, extend to the collector or commutator bars, every other tap passing through the annular ring 18 or in inductive relation thereto. As shown in Figure 16, the taps that pass through the ring 18 are illustrated as being bunched together in one cable, although this is not necessary. The action of the device 18 will be later pointed out.

On the switch-plate 6 are mounted a pair of switch-blades 20 and 21. These blades are preferably of good conducting material such as laminated strips of copper, each mounted on its stud 22 rotatably carried in a sleeve, and each resiliently held by spring 23 against the inner face of the switch-plate 6, and contacts lettered $a$, $c$, $e$, $g$, $i$, $k$, in one group adapted to be engaged by the switch-blade 20, while the switch-blade 21 engages contacts $b$, $d$, $f$, $h$, $j$, $l$. It will be noted that in Figures 9 and 10, these contacts $a$ to $l$ inclusive are arranged arcuately in groups with respect to the pivotal centers of the switch-blades 20 and 21. Connection is made from the extremity of the winding S (see Figure 18) to the switch-blades 20 and 21 by means of lugs 24, one for each of the studs 22. The contact lugs 24 tightly engage sleeves which carry the studs 22.

Rigidly connected to the pivotal end of the switch-blade 20, is a gear 25 of the Geneva type, preferably made of strong insulating material such as micarta, having notches 26 therein to cooperate with a pin 27 carried on a disc 28. The disc 28 has an annular portion or flange 29 which is in engagement with the concave portions 30 of the Geneva gear 25 which thus prevents the Geneva gear from being turned until the pin 27 comes into alignment with a notch 26 in the Geneva gear 25. The flange 29 has a slot 31, the width of which is such as to allow a segment of the Geneva gear between a pair of notches 26 to enter, and the pin 27 will enter one of the notches 26 so as to turn the Geneva gear and likewise carry with it the switch-blade 20 from one of the contacts in the group of contacts with which the switch-blade 20 is associated, to the next adjacent contact.

Associated with the switch-blade 21 on the opposite side of the disc 28, is another Geneva gear similarly constructed and arranged as has already been described with respect to the gear 25.

The disc 28 is pivotally mounted on a bearing bracket 32 fastened to the plate 6 in any satisfactory manner. On the outer end of the spindle 33, carrying the disc 28, is fastened, by a pin 34, a gearwheel 35. The gearwheel 35 is adapted to mesh with a pinion 36 carried on an operating shaft 37 which may be operated manually as by a knob 38, or by an electric motor 39 as illustrated in Figures 2 and 3. The shaft 37 is preferably supported from the base 1 by a bearing bracket 40.

Preferably mounted on the switch-plate 6, as by a pin 41, is a sector 42. The sector 42 is provided with an elongated slot 43 within which operates a pin 44 carried on a member 45 fastened to the disc 28. The free end of the sector 42 is provided with gear-teeth 46 adapted to mesh with a pinion 47 carried on an auxiliary shaft 48 having one end pivoted on the switch-plate 6 and the other pivoted in the spindle 13 of the collector 12.

The auxiliary shaft 48 carries an insulator 49 which may be fastened thereto in any satisfactory manner as by pin 50. The insulator 49 carries a circular-shaped member 51 having an extended arm 52. To the arm 52 is attached a stud 53 which carries a brush and brush-holder collectively referred to as 54. The tension of the brush 54 on the collector or commutator may be regulated by a spring 55, one end of which engages a second stud 56 carried on the arm 52. Current is conveyed to the circular-shaped member 51 by means of a brush 57 resiliently mounted in a brush-holder 58 supported on the switch-plate 6. A connecting wire is connected to the brush-holder 58 in any satisfactory manner as by a pair of clamping nuts 59.

Figure 18:
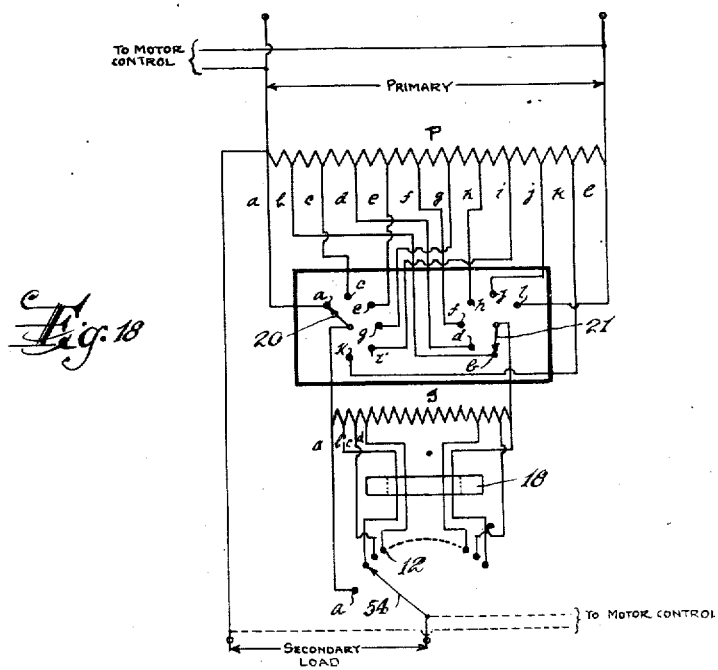
Figure 18 is a diagram of the circuit connections used in one form of my controller such as shown in Figures 1 and 4 and associated figures.

Referring to Figure 18, it will be seen that taps $a$ to $l$ inclusive, taken from the winding P of the primary transformer 7, extend to the switch contacts mounted on the switch-plate 6 as has been described, it being noted that alternate taps go to successive or adjacent contacts on the switch-plate, the reason for which will now be pointed out in the operation of the device.

Referring to the diagrammatic Figures 18 and 20, and assuming that the switch-blade 20 is on its initial contact $a$, and the switch-blade 21 on its initial starting contact $b$, and the brush 54 is on the initial starting commutator bar $a$, there is no voltage applied to the secondary load leads, they both being connected at that moment to the same side of the primary source of power.

As the main operating shaft 37 (see Figure 6) is turned, either manually by the knob 38, or by the motor 39 and its automatic controls, the brush 54 is caused to sweep over the outer periphery of the collector or commutator bars, thereby applying to the load circuit a voltage equal to that of the section from $a$ to $b$ of the primary winding P, it being understood that a source of current supply is connected across the terminals of the winding P. It should be noted at this point that the taps from the primary transformer are in relatively coarse steps, while the taps from the secondary or fine-step transformer winding S are taken very frequently; that is, at one or more turns or at every turn, or in some cases, fractions of a turn, whereby the voltage changes by the brush 37 as it sweeps around the commutator may be the order of one-half to one volt.

As the brush 54 reaches the end of its movement to the right, looking at Figure 18, the sector 42 is at substantially its full movement to one side of the center line, for example as shown in diagram A, Figure 20, and the pin 44 will be at about the longitudinal center of the slot 43, the pin 44 being then near a horizontal plane and at a point where there is considerable rotary movement of the disc 28, without moving the sector 42; and at this position, the pin 27 will move into one of the slots 26 in the Geneva gear 25 associated with the switch-blade 20, and this blade will then be moved to the contact c, diagram B, Figures 18 and 20, and immediately the switch-blade 20 reaches the contact c, the brush 54 automatically starts rotating around the collector in reverse direction, even though the operating shaft 37 is still turned in the same direction as before.

As the brush 54 reaches substantially its full travel in this reverse direction, the sector 42 will have moved to the position indicated in diagram B, Figure 20, and the pin 44 will be positioned in the slot 43 on a horizontal plane but on the opposite end of a diameter from the first position mentioned, and the pin 27 will engage one of the notches 26 in the Geneva gear associated with the switch-blade 21, thereby moving it to the position d, diagram C, Figure 20, and the voltage of the coil sections from a to d of the primary winding P will be diminished as the brush 54 sweeps to the left. When the brush 54 reaches its full travel to the left, then the switch-blade 20 is moved to the contact e and so on as indicated by Figures 18 and 20, until the switch-blade 20 reaches the contact k and the switch-blade 21 reaches the contact l, at which position the switch-blade 20 engages the stop 60 and the switch-blade 21 engages the stop 61. At this time, the brush 54 is at the extreme position to the right, looking at Figure 18, and the full potential of the primary winding P is then applied to the load circuit.

From what has been said, it will be seen that the voltage applied to the load circuit may be varied in fractional parts of the voltage of the sections a to l inclusive of the primary winding P. Since the sections a to l of the winding P are preferably composed of only a few turns, by the action of the secondary winding S which has taps as previously indicated, the voltage applied to the load circuit may be varied very smoothly and it is to be noted that the arrangement of the switch-blades 20 and 21 and their associated contacts is such that the load circuit is never opened, and there are no jumps or flickers in the load circuit as the controller is operated.

In order to eliminate all sparking as the brush 54 moves from one commutator bar to another, alternate taps on the secondary winding S pass through the member 18 as has been explained. It will be readily understood that when the brush 54 bridges two of the bars of the collector, a closed circuit is made, including the turns or fractions of a turn embraced by the two adjacent taps coming from the secondary winding S, and the current, then flowing in this coil across the brush, sets up a counter E. M. F. by reason of the loop around the magnetic core member 18 and chokes down the current which tends to be set up in this short circuited winding. This action, together with the low voltage generated between taps of the winding S, combine to produce a substantially sparkless action of the brush on the commutator. Because of the very low voltage set up in the said loop circuit, extremely little or no reactance is introduced into the regulated circuit, even if the brush, which preferably is not thicker than the thickness of a bar, should stop across two bars.

Figure 21:
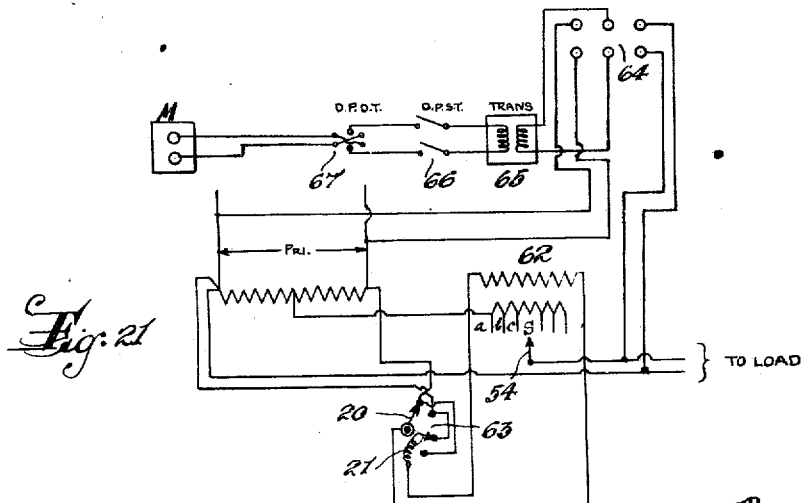
Figure 21 is a circuit diagram of a somewhat modified form of controller.
Figure 11:
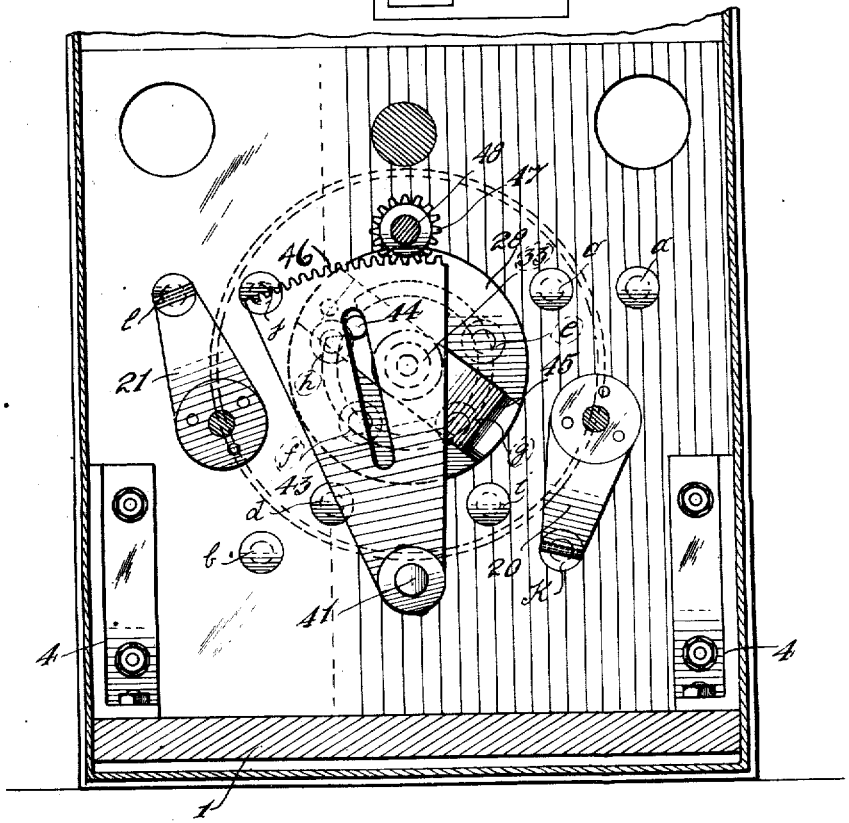
Figure 11 is a view on the line 11—11 of Figure 6 with certain of the parts ready to begin a cycle of operation.

In Figure 21, there is shown a modified form of controller in which the primary transformer P has its terminals connected to a reversing switch having switch-blades corresponding to 20 and 21, parts of which switch are also connected across a winding 62 arranged on the same core with the winding S, one terminal of which is connected to the central point of the primary winding P, which, itself, has one extremity connected to the load circuit, while the other terminal of the load circuit is connected to the brush 54 of the collector having its bars connected by taps to the winding S as has been described with respect to Figure 18.

With the reversing switch 63 in one position, the winding 62 is excited so as to generate in the wnding S a voltage which will add to the voltage generated in one-half of the primary winding P, while with the reversing switch 63 in its other position, the winding 62 will generate a voltage in the winding S so as to cause this to subtract its voltage from one-half of the winding P. Thus the voltage on the load circuit may be varied from substantially zero to the full potential of the source applied to the winding P by very fine steps to the taps in the secondary winding S and the collector.

Figure 19:
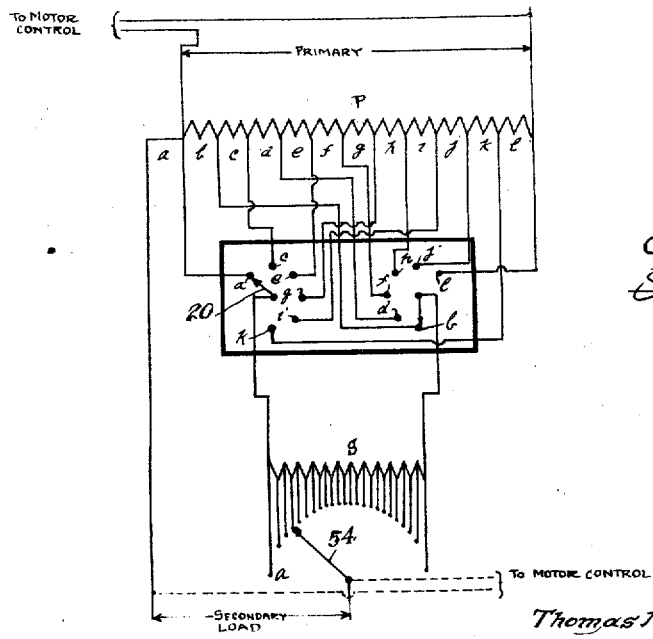
Figure 19 is a view similar to Figure 18, except the short-circuit limiting device is not shown.

Figure 21 shows a double-pole, double-throw switch 64 which may be utilized to throw the transformer 65 either onto the load circuit or across the supply circuit, the transformer 65 being utilized, if necessary, to reduce the voltage applied to the motor used for actuating the controller. A switch 66 may be used for starting and stopping the motor, and a reversing switch 67 may be used for reversing the direction of the motor to operate the controller in reverse direction as has been described. It may be noted that Figures 18 and 19 show that the motor control may be connected to either the primary or the load circuits.

Figure 26:
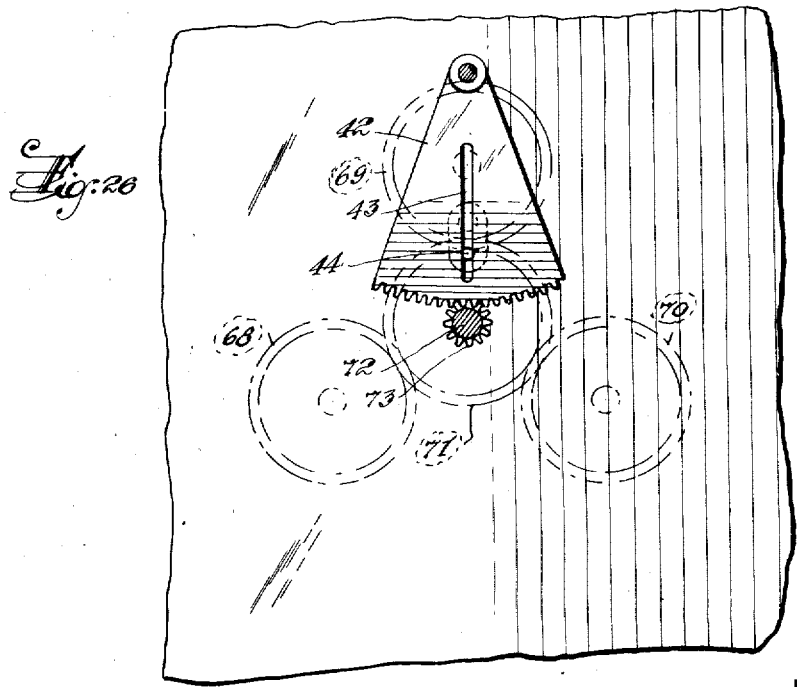
Figure 26 is a view on the line 26—26 of Figure 22.
Figure 27:
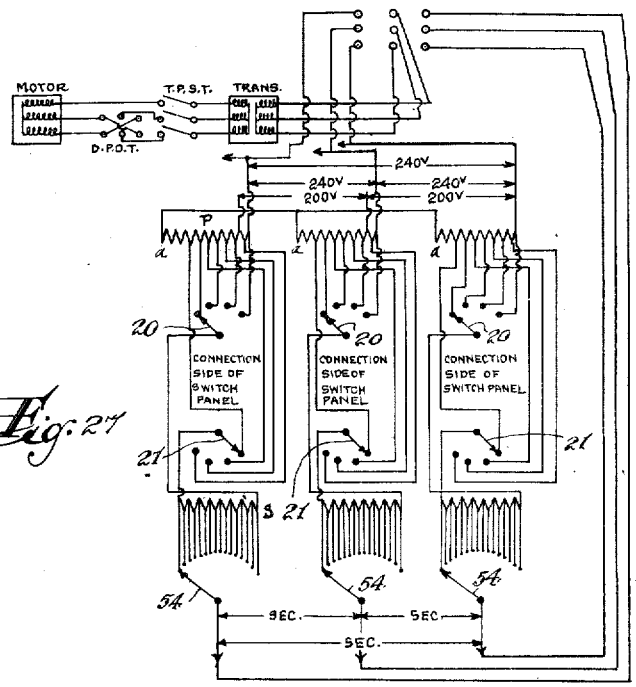
Figure 27 is a diagrammatic arrangement of the three-phase regulator shown in Figure 22.

In Figure 22, I have illustrated a longitudinal, vertical section through a three-phase controller, a diagram of the same being shown in Figure 27, wherein the primary and secondary transformers P and S, and the switch-blades 20 and 21 and associated parts for each phase are substantially like those already described with respect to Figure 18, except for the following differences:

In Figure 22, the primary transformers 7 are arranged two at the bottom of one end of the casing, while the third one is placed above and between the lower two. The three secondary transformers 8 are arranged on the shelf above the primary transformers 7. The three collectors or commutators 12 are arranged in a triangular manner as indicated in Figures 26 and 27 and are operated through the gears 68, 69 and 70 which in turn are operated by a common gear 71 carried by a shaft 72 carrying a pinion 73. The pinion 73 is adapted to mesh with the sector 42 similar to that shown in Figure 6. The pin 44, operating in the slot 43 of the sector 42, is carried by a crank-arm 74 carried on a shaft 75 carrying a gear 76 in mesh with another gear 77 which in turn meshes with a pinion 78 fastened to an operating shaft 79. The shaft 79 shows a hand-control member 80, but a motor may be connected thereto as has been already explained with respect to the other figures. The shaft 75 also carries a pinion 81 meshing with a gear 82 carrying an index finger 83 positioned outside the casing to indicate the position of the controller. Also carried on the shaft 75, is an operating disc 28 similar to that shown in Figure 6. This disc carries a pin 27 for actuating a pair of Geneva gears 25 similar to those already described.

In Figure 22, only a part of one of these Geneva gears 25 is illustrated. However, the shaft carrying one of the Geneva gears 25 extends to a support member 84 in the casing and has mounted thereon, but insulated from each other, three of the switch-blades 20, while the other Geneva gear not shown in Figure 22, has its shaft extended and carries the other three switch-blades 21 each insulated from the other, the contacts for all the blades being carried on the switch-plates 85, 86 and 87 supported from the support member 84.

Figure 25:
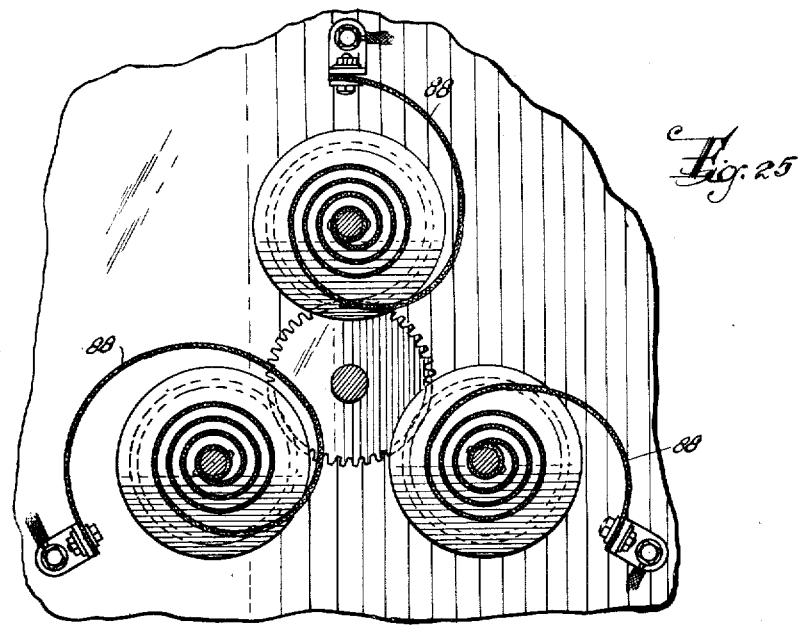
Figure 25 is a view on the line 25—25 of Figure 22.

Operation of the main driving shaft 79 will therefore alternately operate all of the switch-blades 20 and then all of the blades 21, immediately following a full movement of the brushes 54. In other words, the respective circuits for the three phases will be operated simultaneously as in the single-phase arrangement. It may be noted that the method of carrying current to the studs carrying the brushes 54 is by means of a flexible copper cable 88 as shown in Figure 25, instead of the method shown in Figure 6. In addition, the type of brush-holder shown in Figure 24 is somewhat different from that shown in Figure 6.

Figure 28:
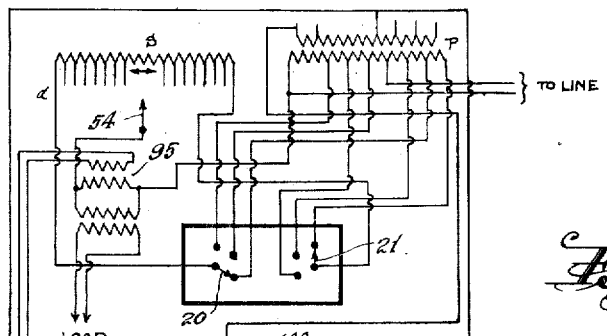
Figure 28 is a wiring diagram similar to Figures 18 and 19, but with additional automatic features added thereto.
Figure 29:
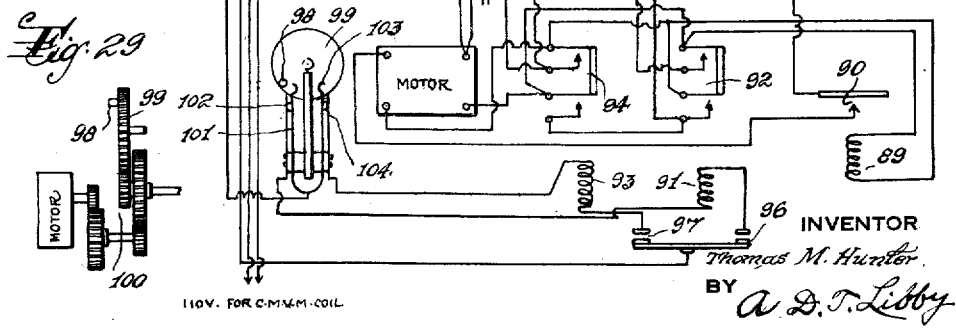
Figure 29 is a diagrammatic illustration of the method of controlling the limit switch shown in Figure 28.

In Figures 28 and 29, I have shown more in detail certain of the automatic mechanism which may be used with my controller.

In Figure 28, the motor for operating the regulator is controlled by a relay 89 operating a contact 90. The relay 89 is in turn controlled by the relay 91 having contacts generally referred to as 92, and relay 93 having contacts generally referred to as 94. In this arrangement, when the line voltage increases, the voltage in the secondary winding of the transformer 95, which secondary extends to the coil of the contact-making voltmeter as indicated, causes the voltmeter to be actuated to close the contact 96 of the contact-making voltmeter. The relay 91 is then operated, whereby the contacts 92 are brought into closed position.

This closing of the contacts 92 actuates the relay 89 and likewise closes the contact 90, thus closing the motor circuit, and the motor will run in a direction to cause the brush 54 to travel over the commutator to decrease the load voltage as described for the manual operation.

As soon as the load voltage is decreased to a value such that there is a potential of say 110 volts, assuming that this is the potential being regulated across the transformer 95, the contact-making voltmeter returns to normal position, opening the contact 96, thereby causing de-energization of the relay 91, and the opening of the contacts 92, as well as the de-energization of the relay 89, causes the motor to stop, as well as the movement of the brush 54 of the regulator.

When the line voltage decreases, the voltage of the secondary of the transformer 95 likewise decreases, causing the contact-making voltmeter to operate to close a contact 97, thereby operating the relay 93 and closing the contacts 94 and actuating the relay 89, but the motor will start in reverse direction by reason of the connections through the contacts 94. The brush 54 will then be caused to travel over the commutator to increase the voltage and as before, when the voltage across the transformer 95 reaches the chosen voltage, that is, 110 volts, the contact-making voltmeter returns to normal position, opening the contact 97 and deenergizing the relays 93 and 89, stopping the motor and movement of the brush 54.

As the line voltage increases to a value greater than the regulator is designed to compensate for, the regulator operates as before, only going to its maximum position, at which time a pin 98 carried on a gear 99 geared to the motor M through a set of reducing gears 100, as indicated in Figure 29, will engage the lever 101, thereby opening a contact 102 which is in the circuit of the relay 91, de-energizing this relay as well as the relay 89, and also stopping the motor. This limit switch will remain open until the regulator turns in the opposite direction.

Conversely, if the line voltage decreases to a value below which the regulator is designed to compensate for, the regulator operates as before, only going to its maximum position in the reverse direction, at which time the limit switch pin 99 engages a spring 103, opening the contact 104 and thereby the circuit through the relay 93, de-energizing it and the relay 89, and stopping the motor; likewise, the contact 104 will remain open until the regulator turns in the opposite direction. It may be noted that 108 is a condenser which is preferably used in the motor circuit to better synchronize its operation.

While I have only shown the short-circuit-limiting device 18 in connection with Figure 18, it is understood that I prefer to use it in all the combinations shown. It may be noted that the controller is made as an integral device, for example, such as shown in Figure 1, and to make connection thereto, the end member 2 preferably carries a plug receptacle 105 to receive a plug having the primary source of current attached thereto; also, the end member 2 may carry another plug receptacle 106 to receive a plug connected to the secondary or load circuit. As shown in Figure 5, 107 is a resistance used in the voltmeter circuit of the automatic control of the regulator. It may also be noted that the fine regulating transformer 8, having the winding S, may be much smaller and of a much lower current capacity than the winding P on the transformer 7, because of the relation of the respective windings, from which it will be seen that the maximum load on the winding S is when the brush 54 is at the center tap.

While I have shown, for example in Figure 18, the regulator arranged to raise and lower the voltage of a source of current applied to the transformer winding P, the regulator is adapted for use and operation in a reverse direction; that is, the voltage to be regulated may be applied to the fine transformer winding S, and the winding having the coarse taps may act as the primary of a step-up transformer.

The voltage regulator herein shown and described has a very wide voltage range and exceedingly fine control; that is, the change of voltage between the fine steps is very small and the regulation is exceedingly smooth—much more so than in any other regulator of which I am aware.

Is is to be understood that, while I have shown structures which I have found to be satisfactory in practice by their actual construction and operation, many of the details may be varied without departing from the spirit of my invention or the scope of the appended claims.

What I claim is:

1. Voltage regulating means including; a primary transformer having a winding adapted to be connected to a source of alternating current, a pair of plural contact switches each having a blade movable independent of the other to engage with said contacts, alternately spaced taps from said winding to successive contacts of said switches, a secondary transformer having a winding connected to said movable switch-blades, taps from said secondary winding, a stationary collector of the commutator type having bars to which said last-mentioned taps are connected, a rotatable arm interconnected with said switches so as to operate synchronously and in sequence therewith, a brush carried by said arm in rotatable engagement with said collector bars and adapted to be connected into a load circuit, means for rotating said arm and brush around the collector, and means for moving said switch-blades alternately and at synchronous intervals with said brush arms as and for the purpose described.

2. Voltage regulating means as set forth in claim 1, further characterized in that the means for rotating the brush and switch-blades are co-related so either blade is not shifted to another contact until the brush has reached the limit of its movement around the collector in one direction of travel and means for then automatically reversing its direction of movement immediately following the shifting of one of said switch-blades to another contact.

3. Voltage regulating means as set forth in claim 1, further characterized in that the taps on the primary transformer winding divide the same into sections having several turns, while the taps from the secondary transformer winding are in relatively fine steps, and further characterized in that the switch contacts are spaced apart so the switche-blade will never bridge two adjacent contacts but the two transformer windings are interconnected through said switch so the load circuit including the rotatable brush is never opened and further characterized in that automatic means are provided for controlling the movements of said switch-blades and brush.

4. A voltage regulating means as set forth in claim 1, characterized in that the means for rotating the arm and brush and the means for moving said switch-blades, include gearing members so co-related that for the same direction of motion of the main driving member, the brush makes a full travel in one direction, and then one of said switch-blades is moved to a succeeding contact followed by a full travel of the brush in the opposite direction, and then the blade of the other switch is moved to a succeeding contact and so on until the last switch contact is reached, when the operations may be reversed by reversing the direction of rotation of the main driving member.

5. A voltage regulating means as set forth in claim 1, characterized in that the means for rotating the arm and brush and the means for moving said switch-blades, include a main driving shaft with means for operating it, a pinion on said shaft, a switch-plate carrying said switch contacts, a supplemental shaft carried by said switch-plate and having a gear thereon in mesh with said pinion, a disc on said supplemental shaft on the opposite side of said plate from said gear, said disc havng an annular surface on one face thereof with a notch in said surface and a pin extending toward said plate from the same face of the disc as said annular surface and positioned over said notch, and a pair of Geneva gears positioned, one on each side of said supplemental shaft and adapted to be operated by said pin, said Geneva gears being preferably of strong insulating material and mounted for rotation on said switch-plate and carrying said switch-blades into engagement with said contacts, a sector pivotally mounted at one end on said plate and having gear-teeth on its periphery, an auxiliary shaft carrying said rotatable brush arm and having one end journaled in the switch plate and the other end in the collector, a pinion carried by said auxiliary shaft in engagement with the gear teeth on said sector, said sector also having a radial slot therein, a second pin carried by said disc and projecting into said slot, a brush holder carried by said switch-plate and carrying a brush for continuous engagement with said rotatable brush arm.

6. A voltage regulating means as set forth in claim 1, characterized in that the means for rotating the arm and brush and the means for moving said switch-blades, include a rotatable, slotted sector geared to an auxiliary shaft carrying said brush arm and a pair of Geneva gears mounted for rotation with said switch-blades, with a common means for operating the Geneva gears and the sector comprising a disc having a pin positioned in the slot of the sector and another pin to engage the notches in the Geneva gears alternately as and for the purposes described, and means for operating said disc.

7. A voltage regulator including a casing, a switch-plate mounted at one end of the casing, a primary and a secondary transformer mounted at the opposite end of the casing, means carried by that end of the casing adjacent said transformer for making connections from a source of power and the load circuit to said transformers, two sets of switch contacts carried by said switch-plate, a switch-blade for each set of contacts rotatably carried on said plate, taps from said primary transformer to said sets of contacts, a collector of the commutator type fixedly mounted between the transformers and said switch-plate, taps from the secondary transformer to the bars of the commutator, an arm rotatably carried by said switch-plate, a brush carried by said arm in rotary engagement with the commutator, means for connecting one side of the load circuit to said arm, means for rotating said arm and means for alternately moving said switch-blades to successive contacts after said arm and brush have made a full movement around the commutator.

8. A voltage regulator as set forth in claim 7, further characterized in that a member of magnetic material is positioned adjacent the collector, and the conductors to alternate bars thereof are passed through said member for the purposes described.

9. Voltage regulating means as set forth in claim 1, characterized in that a member of magnetic material is provided and alternate taps from the secondary transformer to the collector are passed in inductive relation with respect to said member for the purpose described.

10. Voltage regulating means as set forth in claim 1, characterized in that an annular ring of magnetic material is provided and alternate taps from the secondary transformer to the collector are passed through said ring for the purpose described.

11. Voltage regulating means including, windings wound on separate magnetic cores, one of said windings adapted to be connected to a source of alternating current, a pair of independently movable switch-blades, sets of contacts for each of said blades, taps from said one winding to said contacts, alternate taps going to the same set of contacts, a stationary collector of the commutator type having its bars connected to taps on another of the windings, the extremities of which are connected to said switch-blades, a brush mounted to be rotated about said collector and connected into the load circuit, means for moving the brush around said collector at synchronous intervals between movements of said switch-blades, and means for automatically alternately moving said switch-blades in sequence to successive contacts in the respective blade sets of contacts at the end of each complete travel of said brush in one direction.

12. Voltage regulating means as set forth in claim 11, further characterized in that a short-circuit limiting device is provided as the brush passes from one bar to another, said device comprising a ring of magnetic material with alternate taps from the second winding to the collector passing through said ring.

13. In a voltage regulator including a collector of the commutator type having a brush mounted to be rotated around the periphery of the collector and connected into the load circuit, a transformer having a winding with taps extending to the bars of said collector and means for limiting the short-circuit current in said winding as said brush moves from one bar to another, said means comprising a ring of magnetic material, having alternate taps from the winding to adjacent collector bars, going through said ring.

14. In a voltage regulator including a transformer having a winding, taps therefrom extending to metallic members arranged in succession, a movable contact connected into the load circuit and arranged to engage said metallic members and means for limiting the short-circuit current in said winding as said contact moves from one metallic member to the next adjacent one, said means comprising a member of magnetic material, having alternate taps from the winding to said metallic members, passing in inductive relation to said member of magnetic material.

15. Voltage regulating means, including a primary transformer connected to a supply circuit, a secondary transformer, a collector of the commutator type having its bars connected to closely adjacent parts of a winding on the secondary transformer, a brush connected to the load circuit, means for causing relative movement between the brush and collector, independently operable switch-blades connected to said secondary winding and synchronously timed with said brush, contacts adapted to be engaged by said switch-blades, said contacts being connected to portions of said primary winding, said switch-blades and contacts being arranged with respect to each other and said brush so that the load circuit is never opened while the brush and switch-blades are being used.

16. Voltage regulating means as set forth in claim 15, further characterized in that means are provided for moving said switch-blades alternately and then only after a full operation of movement between the brush and collector in one direction has taken place.

17. Voltage regulating means as set forth in claim 15, further characterized in that means are provided for moving said switch-blades alternately and then only after a full operation of movement between the brush and collector in one direction has taken place, and means for automatically reversing the relative movement between the collector and brush after one of said switch-blades has been moved.

18. Voltage regulating means including a primary transformer having a winding adapted to be connected to a source of current supply, a pair of independently operable switch-blades having cooperating contacts for each blade and connected to said winding, a secondary transformer having a winding connected to said switch-blades, a collector of the commutator type, a winding on the secondary transformer having taps going to the bars of said collector, a contact to movably engage said bars and connected into the load circuit, the other side of the load circuit being connected to one end of the winding on the primary transformer and means for operating in sequence the contact and said switch blades automatically and synchronously.

19. Voltage regulating means including a primary transformer having a winding adapted to be connected to a source of current supply, a reversing switch having parts connected to said winding, a secondary transformer having a winding connected to other parts of said reversing switch, a further winding on the secondary transformer having one end thereof connected to the center of said winding on the primary transformer, a collector of the commutator type having its bars connected to closely adjacent parts of said further winding on the secondary transformer, a contact for movably engaging the collector and connected into the load circuit, the other side of which is connected to the winding on the primary transformer.

20. Voltage regulating means including a pair of transformers, a collector of the commutator type having its bars connected to closely adjacent parts of a winding on one of said transformers, a contact connected into the load circuit and mounted to rotate about said collector, means for rotating said contact about the collector, a winding on the other of said transformers, a winding on the first-mentioned transformer, a reversing switch connected between the last two mentioned windings for reversing the action of one with respect to the other, the tapped winding on the first transformer having one extremity connected to the center of the winding on the second-mentioned transformer.

21. A polyphase voltage regulator including; a plurality of primary transformers each having a winding connected to a primary source of current, a plurality of secondary transformers corresponding in number to the primary transformers, each having a winding with taps extending therefrom, a collector of the commutator type on each of said secondary transformer windings and each having a brush connected to a load circuit and mounted for rotary movement about its collector, the bars of which are connected to said taps, a pair of switch-blades for each secondary transformer mounted for rotary movement and connected to the ends of its associated secondary transformer winding, a set of contacts for each switch-blade, said contacts being connected, one from each group to alternate taps on said primary winding, and means for actuating all of said brushes in unison and then moving all of said switch-blades of one set as herein defined at the end of a full movement of the brushes in one direction.

22. A polyphase voltage regulator including; a plurality of primary transformers each having a winding connected to a primary source of current, a plurality of secondary transformers corresponding in number to the primary transformers, each having a winding with taps extending therefrom, a collector of the commutator type on each of said secondary transformer windings and each having a brush connected to a load circuit and mounted for rotary movement about its collector, the bars of which are connected to said taps, a pair of switch-blades for each secondary transformer mounted for rotary movement and connected to the ends of its associated secondary transformer winding, a set of contacts for each switch-blade, said contacts being connected, one from each group to alternate taps on said primary winding, and a single means comprising a geared slotted sector for moving all of said brushes in unison, means for operating said sector, and further means comprising a pair of Geneva gears for alternately moving said sets of switch-blades, and a common means for turning said Geneva gears alternately for the purposes describ 1.

23. A polyphase voltage regulator as set forth in claim 21, further characterized in that a common means is provided for causing all of said brushes to move around the collectors in unison and at the end of each movement in one direction to cause all the switch-blades in one set to move simultaneously to the next adjacent associated contacts, and then to automatically reverse the direction of movement of said brushes, with means for stopping the action after a full cycle of movement of the brushes and switch-blades has been attained.

24. Voltage regulating means as set forth in claim 1, further characterized in that automatic means are provided for controlling the operation of said brush and switch-blades.

25. Voltage regulating means as set forth in claim 1, further characterized in that automatic means are provided for controlling the operation of said brush and switch-blades, and an automatic switch for stopping the actuating means when the range of compensation of the voltage regulating means has been reached in either direction.

26. A polyphase voltage regulator as set forth in claim 21, further characterized in that a common means is provided for causing all of said brushes to move around the collectors in unison and at the end of each movement in one direction to cause all the switch-blades in one set to move simultaneously to the next adjacent associated contacts and then to automatically reverse the direction of movement of said brushes, with means for stopping the action after a full cycle of movement of the brushes and switch-blades has been attained and further characterized in that said common means is automatically actuated in accord with the variation of the line voltage, and still further characterized in that a switch is automatically operated to stop said actuating means when the range of compensation of the voltage regulating means has been reached in either direction.

27. Voltage regulating means including, at least a pair of separate transformer windings, one having coarse taps and the other fine taps, the coarse taps from one winding being interconnected to the other winding through a pair of independently operable, direct contact-making switches with means for operating the switches alternately so the circuit between the windings including the loud circuit is never opened, a collector of the commutator type having bars connected to the fine taps of said other winding, a brush adapted to be continuously connected to a circuit whose voltage is to be regulated, said brush being mounted for rotation around said collector, and means for moving said brush at synchronous intervals between movements of said switches.

28. Voltage regulating means as set forth in claim 27, further characterized in that means are provided to control the switches so they are never moved from one position to another until the said brush has completed its full movement of travel in one direction around the collector.

29. Voltage regulating means as set forth in claim 27, further characterized in that means are provided to control the switches so they are never moved from one position to another until the said brush has completed its full movement of travel in one direction around the collector, and further characterized in that means are provided for automatically reversing the direction of movement of the brush after one of the switches has been moved.

30. Voltage regulating means as set forth in claim 27, further characterized in that automatic means are provided for controlling the operation of said switches and brush movements.

31. Voltage regulating means as set forth in claim 27, further characterized in that automatic means are provided for controlling the operation of said brush and the switches, and an automatic means for stopping the first-mentioned automatic means when the range of compensation of the voltage regulating means has been reached in either direction.

32. Voltage regulating means as set forth in claim 27, further characterized in that a member of magnetic material is positioned adjacent the collector and the conductors to alternate bars thereof, are passed in inductive relation to said member.

THOMAS M. HUNTER.

CERTIFICATE OF CORRECTION.

Patent No. 1,993,007. March 5, 1935.

THOMAS M. HUNTER.

It is hereby certified that error appears in the printed specification of the above numbered patent requiring correction as follows: Page 5, first column, line 45, claim 3, for "switch-blade" read switch-blades; page 7, second column, line 20, claim 27, for "loud" read load; and that the said Letters Patent should be read with these corrections therein that the same may conform to the record of the case in the Patent Office.

Signed and sealed this 9th day of April, A. D. 1935.

Leslie Frazer
(Seal) Acting Commissioner of Patents.